United States Patent [19]

Kidoh et al.

[11] 4,251,405
[45] Feb. 17, 1981

[54] PROCESS FOR PRODUCING PLASTICIZED VINYLIDENE CHLORIDE-VINYL CHLORIDE COPOLYMER

[75] Inventors: Kunizoh Kidoh; Hideki Wakamori; Hidetora Kashio, all of Iwaki, Japan

[73] Assignee: Kureha Kagaku Kogyo Kabushiki Kaisha, Tokyo, Japan

[21] Appl. No.: 33,984

[22] Filed: Apr. 27, 1979

[30] Foreign Application Priority Data

May 31, 1978 [JP] Japan .................................. 53-64365

[51] Int. Cl.$^3$ ....................... C08L 91/00; C08F 14/08; C08F 114/08; C08F 214/08
[52] U.S. Cl. ........................... 260/18 PF; 260/31.8 R; 526/343
[58] Field of Search ........ 260/18 PF, 18 EM, 31.8 R; 526/344.2, 343

[56] References Cited

U.S. PATENT DOCUMENTS 2,485,160  10/1949  Niederhouser et al. ........ 260/18 EP
3,971,744   7/1976  Hudecek et al. ............... 260/23 EM
4,001,482   1/1977  Schwab .............................. 526/344.2
4,090,994   5/1978  Nagano et al. ................. 260/23 XA

OTHER PUBLICATIONS

Introduction to Polymer Chemistry—J. K. Stille—John Wiley & Sons, Inc., N.Y., London 1962 p. 199.

Primary Examiner—Joseph L. Schofer
Assistant Examiner—Peter F. Kulkosky
Attorney, Agent, or Firm—Oblon, Fisher, Spivak, McClelland & Maier

[57] ABSTRACT

A plasticized vinylidene chloride-vinyl chloride copolymer is produced by copolymerizing 65 to 95 wt. % of vinylidene chloride and 35 to 5 wt. % of vinyl chloride or a mixture of vinyl chloride as a main component and a comonomer wherein 0.5 to 10.0 wt. parts of a plasticizer being soluble in said monomer mixture is added to 100 wt. parts of said monomer mixture and said monomer mixture is copolymerized by a suspension polymerization in the presence of an oil soluble radical initiator and a macromolecular suspending agent in water whereby a blending step can be eliminated.

4 Claims, 1 Drawing Figure

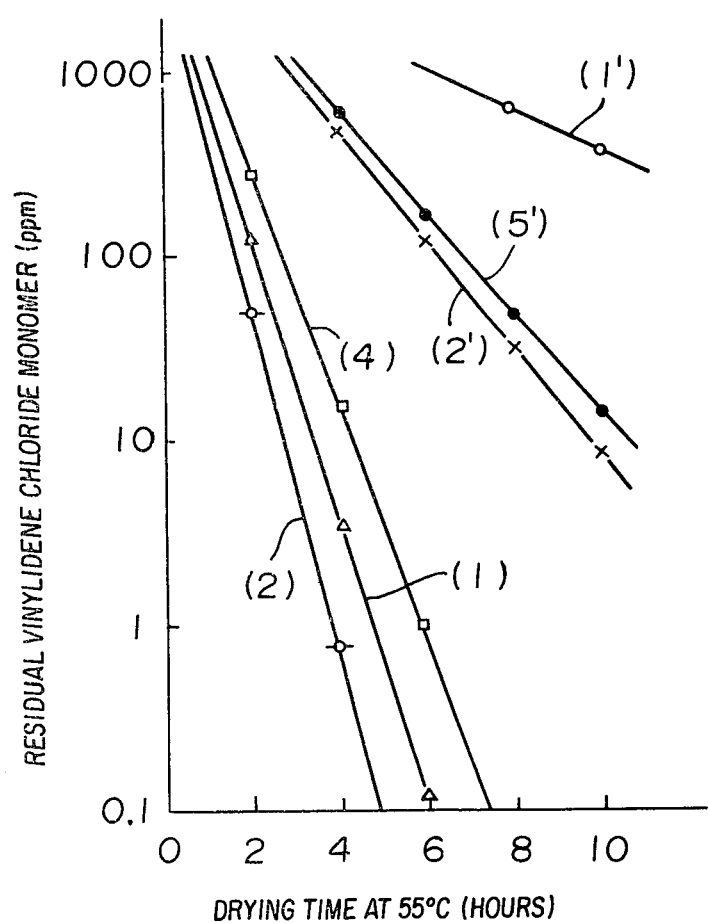

PROCESS FOR PRODUCING PLASTICIZED VINYLIDENE CHLORIDE-VINYL CHLORIDE COPOLYMER

BACKGROUND OF THE INVENTION

1. Field of the Invention

The present invention relates to a process for producing a plasticized vinylidene chloride-vinyl chloride copolymer. More particularly, it relates to a process for producing a plasticized vinylidene chloride-vinyl chloride copolymer having homogeneous quality and containing less residual monomer without a blending step.

2. Description of the Prior Art

Vinylidene chloride-vinyl chloride copolymers especially the copolymers having 65 to 95 wt.% of vinylidene chloride component have characteristic of superior gas barrier property, but have inferior fabricatability. Therefore, in usual, the fabricatability should be improved by blending a plasticizer or a stabilizer in a copolymer powder. The resulting compounds are melt-extruded and quenched to obtain compositions which have superior fabricatability, (for example, stretch-orientation can be easily performed at about room temperature) and which have been fabricated into films, bottles, yarns etc. and have been widely used for food packages and other fields.

In usual, a suspension polymerization and an emulsion polymerization has been employed for producing copolymers. In a suspension polymerization, an emulsifier is not incorporated as different from an emulsion polymerization, whereby excellent heat stability of the resulting polymer can be expected and hygroscopic whitening can be prevented and a post-treatment can be simplified. Therefore, a suspension-polymerization has been widely applied.

However, suspension-polymerized polymers have larger particle diameter in comparison with emulsion-polymerized polymers whereby residual monomers of vinylidene chloride and vinyl chloride remain in the suspension polymerization are not easily removed.

Recently, the residual monomer problem has been seriously considered in plastics used for food packages. It has been seriously desired to minimize the residual monomers in the polymers to be negligible even though the residual monomers are vinylidene chloride, vinyl chloride and other comonomers. Vinylidene chloride has a boiling point of 30° C. which is higher than the boiling point of vinyl chloride, whereby it is difficult to remove completely vinylidene chloride monomer by a conventional post-treatment after the suspension-polymerization. Therefore, vinylidene chloride monomer is removed in a blending step for blending a plasticizer and other additives at high temperature whereby there are certain disadvantages of requiring a long blending time to deteriorate thermal stability of the polymers.

It has been known to reduce contents of the residual monomers by adding a plasticizer in a slurry obtained by a suspension-polymerization of vinylidene chloride and vinyl chloride in Japanese Unexamined Patent Publication No. 101288/1977.

SUMMARY OF THE INVENTION

It is an object of the present invention to provide a process for producing a plasticized vinylidene chloride-vinyl chloride copolymer to minimize contents of residual monomers.

It is another object of the present invention to provide a process for producing a plasticized vinylidene chloride-vinyl chloride copolymer without a step for blending a plasticizer after the suspension polymerization.

It is the other object of the present invention to provide a process for producing a plasticized vinylidene chloride-vinyl chloride copolymer in which a plasticizer is uniformly incorporated without a melt-blending whereby a fabricated product having high thermal stability and substantially no fish-eye and excellent other properties.

The foregoing and other objects of the present invention have been attained by producing a plasticized vinylidene chloride-vinyl chloride copolymer by copolymerizing 65 to 95 wt. % of vinylidene chloride and 35 to 5 wt.% of vinyl chloride or a mixture of vinyl chloride as a main component and a comonomer wherein 0.5 to 10.0 wt.parts of a plasticizer being soluble in said monomer mixture is added to 100 wt.parts of said monomer mixture and said monomer mixture is copolymerized by a suspension polymerization in the presence of an oil soluble radical initiator and a macromolecular suspending agent in water.

DETAILED DESCRIPTION OF THE PREFERRED EMBODIMENTS

The plasticized vinylidene chloride-vinyl chloride copolymer is produced by copolymerizing 65 to 95 wt.% of vinylidene chloride and 35 to 5 wt.% of vinyl chloride or a mixture of vinyl chloride as a main component and a comonomer in a suspension-polymerization after adding 0.5 to 10.0 wt.% of a plasticizer being soluble in said monomer mixture, if desired, 0.10 to 0.002 wt.% of an antioxidant and/or 0.02 to 5.0 wt.% of an epoxidized vegetable oil in the presence of an oil soluble radical initiator and a macromolecular suspending agent in water whereby the residual monomers are removed and a blending step for blending a plasticizer to the polymer can be eliminated.

In the vinylidene chloride-vinyl chloride copolymer, when a content of vinylidene chloride component is more than 95 wt.%, a fabricatability is inferior whereas when it is less than 65 wt.%, a barrier property is inferior to lose the characteristic high barrier property whereby the monomer mixture containing 95 to 65 wt.% of vinylidene chloride and 5 to 35 wt.% of vinyl chloride is used. The physical properties of the copolymer can be controlled by adding a small amount of a comonomer to the mixture of vinylidene chloride and vinyl chloride. In this case, the content of vinylidene chloride is not substantially changed whereby the content of vinyl chloride is reduced depending upon the content of the comonomer.

Various comonomers can be used. Suitable comonomers include $C_1$–$C_{18}$ alkyl acrylates, $C_1$–$C_{18}$ alkyl methacrylate, monoalkyl itaconates and dialkyl itaconates.

The plasticizers should be soluble into the monomer mixture and substantially insoluble in water and impart satisfactory plasticizing efficiency to the vinylidene chloride-vinyl chloride copolymer of the invention and are not toxic for hygiene in food package and should be absorbed in the suspension-polymerized polymer. Suitable plasticizers include esters such as adipates such as dibutyl adipate and dioctyl adipate; sebacates such as dibutyl sebacate and dioctyl sebacate; citrates such as acetyl tributyl citrate, acetyl trioctyl citrate; macromolecular plasticizers such as polyesters obtained by esterifying a glycol e.g. propyleneglycol and butyleneglycol with a dicarboxylic acid e.g. adipic acid and sebacic acid. The plasticizer can be a mixture of said plasticizers. A ratio of the plasticizer is usually in a range of 0.5 to 10 wt.% to total monomers. When the ratio of the plasticizer is less than 0.5 wt.%, the monomer removing effect is inferior and the fabricatability of the product is inferior. When the ratio of the plasticizer is more than 10 wt.%, the monomer removing effect is improved and the fabricatability is improved, but the characteristic high barrier property is lost. From the viewpoints of the monomer-removing effect the fabricatability and the high barrier characteristic, the ratio of the plasticizer is preferably in a range of 1.0 to 5 wt.%.

Suitable antioxidants include 2,6-ditertiary-butyl-4-methyl phenol, 2,2-methylenebis(4-methyl-6-tertiary-butyl phenol), n-octadecyl-$\beta$-(4-hydroxy-3',5'-ditertiary-butyl phenyl) propionate, vitamin E, n-propyl gallate. A ratio of the antioxidant is preferably in a range of 0.002 to 0.10 wt.% to the monomers. When the ratio of the antioxidant is less than 0.002 wt.%, the effect for preventing deterioration caused by oxidation of vinylidene chloride monomer is not imparted and as the result, the copolymer having inferior thermal stability is obtained. Whereas when it is more than 0.10 wt.%, the effect for preventing deterioration is enough high, however the polymerization is stopped or remarkably slow.

Suitable epoxidized vegetable oils have an epoxy value of 3.0 to 10 and include epoxidized soybean oil and epoxidized linseed oil. A ratio of the epoxidized vegetable oil is preferably in a range of 0.02 to 5.0 wt.% to the monomers. When the ratio of the epoxidized vegetable oil is less than 0.02 wt.%, the thermal stability is inferior whereas when it is more than 5 wt.%, the thermal stability is improved but the bleed-out on the surface of the product is caused.

When both of the antioxidant and the epoxidized vegetable oil are incorporated with the oil soluble plasticizer in a mixture of monomers before the polymerization, they are uniformly mixed with the resulting polymer whereby superior thermal stability is imparted in comparison with a case incorporating no plasticizer, a case incorporating only additives without a plasticizer in the mixture of monomers, a case incorporating additives in a slurry after a polymerization or a case incorporating additives in a polymer blending.

The oil soluble radical initiator can be the conventional oil soluble radical initiators used in the copolymerization of vinylidene chloride and vinyl chloride.

Suitable oil soluble radical initiators include peroxides such as lauroyl peroxide, and stearyl peroxide; and peroxy dicarbonates such as diisopropyl peroxydicarbonate, and di-n-propyl peroxydicarbonate.

The macromolecular suspending agent can be water soluble macromolecular suspending agents used in the conventional suspension-polymerization. Suitable macromolecular suspending agents include cellulose derivatives such as methoxycellulose and ethoxycellulose; polyvinyl alcohol, polyethyleneoxide and gelatin. A ratio of the macromolecular suspending agent is preferably in a range of 0.01 to 1.0 wt.% to the monomers. It is the optimum to use methoxycellulose.

The suspension polymerization is carried out in the presence of the suspending agent, the radical initiator, the plasticizer or the antioxidant and/or the epoxidized vegetable oil, at a ratio of the monomer mixture to water of 1/1 to 1/5 at the polymerization temperature of 30° to 80° C. It is possible to incorporate a chain transfer agent for adjusting molecular weight or a buffer agent for adjusting pH.

The resulting suspension polymer can be dehydrated, washed with water and dried. Even though it is plasticized enough to use for extrusion fabrication, the product does not cause blocking at the drying operation to cause a trouble in the drying step. The suspension-copolymers of vinylidene chloride and vinyl chloride of the present invention are relatively porous in comparison with the suspension polymers of vinyl chloride whereby the plasticizer may be absorbed in the particles of the polymer.

The amount of the residual monomers in the dried particles of the polymer is remarkably small and can not be detected.

When the copolymerization is carried out in the presence of suitable amounts of the plasticizer, the stabilizer and the antioxidant, the additives are uniformly dispersed in the polymer whereby a blending step can be eliminated and productivity is improved and energy for the process can be saved, advantageously. Moreover, in the present invention, the quality of the product is remarkably improved. That is, the invention is different from the blending of a powder and a liquid to form an uniform mixture. In the invention, the plasticizer and the other additives are dissolved in the monomer mixture before the copolymerization whereby all of the components are uniformly mixed and the thermal stability of the product at the melt-fabrication is remarkably improved and a long continuous operation for extruding can be improved and qualitites of the finish produce such as transparency of film can be improved and fish eye can be minimized. The thermal stability is improved also because of no blending step in which a heat treatment is given.

The present invention will be further illustrated by certain examples and references which are provided for purposes of illustration only and are not intended to be limiting the present invention.

MEASUREMENT OF RESIDUAL MONOMERS

1 Gram of a polymer powders is admixed with 10 cc of carbon disulfide to extract the residual monomers and contents of vinylidene chloride and vinyl chloride in the extracted solution are measured by a gas chromatography. The unit is ppm.

The detectable limit is 0.05 ppm in the case of vinylene chloride and vinyl chloride.

In the examples, epoxidized soybean oil having an epoxy value of 7-7.5 and epoxidized linseed oil having an epoxy value of 9 are used.

REFERENCE 1

In a 10 liter autoclave made of stainless steel equipped with a stirrer, a solution of 3.0 g of methoxycellulose dissolved in 6,000 cc of deionized water was charged and it was purged with nitrogen gas, and a mixture of 5.1 g of diisopropyl peroxydicarbonate, 0.6 g of 2,6-di-t-butyl-4-methyl phenol dissolved in a monomer mixture of 2,400 g of vinylidene chloride and 600 g of vinyl chloride was charged under an elevated pressure.

The temperature in the autoclave was elevated to 43° C. with stirring and the copolymerization was continued at the same temperature. After the polymerization for 53 hours, the pressure was reduced and the resulting slurry was discharged. The solid was dehydrated and washed with water and dried in Gear's oven at 55° C. for 10 hours to obtain beads of the polymer at a conversion of 82.8%. The contents of residual vinylidene chloride and vinyl chloride were respectively, 370 ppm and 45 ppm.

The dried polymer was charged in a blender and 75.0 g of dioctyl adipate, 30.0 g of epoxidized soybean oil (ESO) and 51.0 g of acetyl tributyl citrate were blended to the dried polymer under heating the blender from room temperature to 80° C. and the mixture was blended at 80° C. for 3 hours and then, cooled to obtain a compound. The compound was extruded by an extruder having a diameter of 40 mm and a ratio of L/D of 18 in an inflation method to obtain a film having a thickness of 20μ.

The properties of the resulting film are shown in Table 1.

Reference 2

In accordance with the process of Reference 1, the copolymerization of the same monomer mixture was carried out in the same condition. After the copolymerization for 53.5 hours, the pressure was reduced and the resulting slurry was discharged. 126 Grams of dioctyl adipate (DOA) was added to the slurry and the mixture was stirred at 40° C. for 2 hours and the solid was dehydrated, washed with water and dried in Gear's oven at 55° C. for 10 hours to obtain beads of the polymer at a conversion of 82.5%.

The contents of residual vinylidene chloride and vinyl chloride were respectively 8.6 ppm and 0.4 ppm which are remarkably lower than those of Reference 1 but not enough low.

Reference 3

In accordance with the process of Reference 1, the copolymerization of the same monomer mixture was carried out in the same condition. After the copolymerization for 53 hours, the pressure was reduced and the resulting slurry was discharged. A mixture of 30.0 grams of epoxidized soybean oil, 75.0 g of dioctyl adipate (DOA) and 51.0 g of acetyl tributyl citrate was admixed with the slurry and the mixture was stirred at 40° C. for 2 hours and the solid was dehydrated, washed with water and dried in Gear's oven at 55° C. for 10 hours to obtain beads of the polymer at a conversion of 82%.

The contents of residual vinylidene chloride and vinyl chloride were respectively 7.5 ppm ad 0.4 ppm which are remarkably lower than those of Reference 1 but not enough low.

In accordance with the process of Reference 1, a film was fabricated by using the resulting polymer. The properties are shown in Table 1 together with the results of Reference 1 and Example 2.

Reference 4

In a 10 liter autoclave made of stainless steel equipped with a stirrer, a solution of 3.6 g of methoxycellulose dissolved in 6,000 cc of deionized water was charged and it was purged with nitrogen gas and then, a mixture of 6.0 g of diisopropyl peroxydicarbonate, 0.6 g of 2,6-di-t-butyl-4-methyl phenol dissolved in 2,340 g of vinylidene chloride and 510 g of vinyl chloride and 150 g of monobutyl itaconate (MBI) was charged under an elevated pressure.

The temperature in the autoclave was elevated at 41° C. with stirring and the copolymerization was continued at the same temperature. After the polymerization for 52 hours, the pressure was reduced and the resulting slurry was discharged. The solid was dehydrated and washed with water and dried in Gear's oven at 55° C. for 10 hours to obtain beads of the polymer at a conversion of 83.7%. The contents of residual vinylidene chloride and vinyl chloride were respectively 560 ppm and 18.1 ppm.

Reference 5

In accordance with the process of Reference 4, the copolymerization of the same monomer mixture was carried out in the same condition. After the copolymerization for 52 hours, the pressure was reduced and the resulting slurry was discharged. 135 Grams of dioctyl adipate (DOA) was added to the slurry and the mixture was stirred at 40° C. for 2 hours and the solid was dehydrated, washed with water and dried in Gear's oven at 55° C. for 10 hours to obtain beads of the polymer at a conversion of 84.0%.

The contents of residual vinylidene chloride and vinyl chloride were respectively 15.9 ppm and 0.8 ppm which are remarkably lower than those of Reference 4 but not enough low.

EXAMPLE 1

In a 10 liter autoclave made of stainless steel equipped with a stirrer, a solution of 3.0 g of methoxycellulose dissolved in 6,000 cc of deionized water was charged and it was purged with nitrogen gas, and a mixture of 5.1 g diisopropyl peroxydicarbonate, 1.6 g of 2,6-di-t-butyl-4-methyl phenol and 126 g of dioctyl adipate (DOA) dissolved in a monomer mixture of 2,400 g of vinylidene chloride and 600 g of vinyl chloride was charged under an elevated pressure.

The temperature in the autoclave was elevated to 43° C. with stirring and the copolymerization was continued at the same temperature. After the polymerization for 53 hours, the pressure was reduced and the resulting slurry was discharged. The solid was dehydrated and washed with water and dried in Gear's oven at 55° C. for 10 hours to obtain beads of the polymer at a conversion of 82.0%.

The contents of residual vinylidene chloride and vinyl chloride were respectively less than the detectable level.

The resulting copolymer had the characteristic to be fabricatable by an extrusion method without any blending step.

EXAMPLE 2

In accordance with the process of Example 1 except charging a solution of 5.1 g of diisopropyl peroxydicarbonate, 0.6 g of 2,6-di-t-butyl-4-methyl phenol, 30 g of epoxidized soybean oil, 75.0 g of dioctyladipate (DOA) and 51 g of acetyl tributyl citrate (ATBC) dissolved in 2,400 g of vinylidene chloride and 600 g of vinyl chloride, the copolymerization of the monomer mixture was carried out the same condition for 53 hours and the polymer was treated. The conversion was 82.1%. The contents of residual vinylidene chloride and vinyl chloride were respectively less than the detectable level.

The resulting copolymer had the characteristics to be fabricatable by an extrusion method without any blending step.

TABLE 1

| | Addition of plasticizer | Thermal stability of the polymer (gear oven method *) | Film Haze** (%) | Film Fish-eye (spots per 0.4 m²) |
|---|---|---|---|---|
| Reference 1 | blending step | black brown | 3.6 | 86 |
| Reference 3 | addition to slurry after polymerization | yellowish brown | 3.0 | 70 |
| Example 2 | dissolving in monomer mixture before polymerization | yellow | 1.0 | 29 |

*Each polymer is molded at 180° C. for 3 minutes under the pressure of 100 Kg/cm² to obtain a pressed sheet having a thickness of 1 mm and the sheet was heated in Gear's oven at 155° C. for 120 minutes.
**Haze is measured by Japanese Industrial Standard K-6714.

As shown in Table 1, when the plasticizer was dissolved in the monomer mixture and the copolymerization was carriet out, the contents of the residual monomers were reduced to be non-detectable. The thermal stability of the compound was remarkably superior and the transparency of the film is remarkably high and fish-eyes are remarkably reduced in comparison with those of the addition of the plasticizer to the slurry after the polymerization or the addition of the plasticizer in a blending step.

EXAMPLE 3

In accordance with the process of Example 1 except charging a solution of 5.1 g of diisopropyl peroxydicarbonate, 0.6 g of di-t-butyl-4-methyl phenol, 60 g of epoxidized soybean oil and 90.0 g of dibutyl sebacate (DBS) dissolved in 2,340 g of vinylidene chloride and 660 g of vinyl chloride, the copolymerization was carried out for 61 hours and the polymer was treated.

The conversion was 82.0%. The contents of residual vinylidene chloride and vinyl chloride were respectively less than the detectable level.

In accordance with the process of Reference 1, the resulting copolymer obtained by washing and drying was fabricated without a blending step to prepare a film having a thickness of 20μ. The thermal stability of the copolymer in Gear's oven method gave pale yellow and Haze % of the film was 0.9 and fish-eyes of the film were 22 per 0.4 m² which are excellent.

The copolymer had the characteristic to be fabricatable by an extrusion method without any blending step.

EXAMPLE 4

In a 10 liter autoclave made of stainless steel equipped with a stirrer, a solution of 3.6 g of methoxycellulose dissolved in 6,000 cc of deionized water was charged and it was purged with nitrogen gas, and a mixture of 6.0 g of diisopropyl peroxydicarbonate, 0.6 g of 2,6-di-t-butyl-4-methyl phenol, 126 g of dioctyl adipate (DOA) and 60 g of epoxidized soybean oil dissolved in 2,340 g of vinylidene chloride 510 g of vinyl chloride and 150 g of monobutyl itaconate (MBI) were charged under an elevated pressure.

The temperature in the autoclave was elevated to 41° C. with stirring and the copolymerization was continued at the same temperature. After the polymerization for 52 hours, the pressure was reduced and the resulting slurry was discharged. The solid was dehydrated and washed with water and dried in Gear's oven at 55° C. for 10 hours to obtain beads of the polymer at a conversion of 83.5%. The contents of residual vinylidene chloride and vinyl chloride were respectively less than the detectable level.

In accordance with the process of Reference 1, the resulting copolymer obtained by washing and drying, was fabricated without a blending step to prepare a film having a thickness of 20μ. The thermal stability of the copolymer in Gear's oven method gave pale yellow and Haze % of the film was 1.2 and fish-eyes of the film were 36 per 0.4 m² which are excellent.

EXAMPLE 5

In a 10 liter autoclave made of stainless steel equipped with a stirrer, a solution of 3.0 g of methoxycellulose dissolved in 6,000 cc of deionized water was charged and it was purged with nitrogen gas and a mixture of 6.0 g of diisopropyl peroxydicarbonate, 0.6 g of 2,6-di-t-butyl-4-methyl phenol and 25 g of epoxydized soybean and 135 g of polyester plasticizer (Adeca Argus Co. Ltd.; PN-150) dissolved in 2,550 g of vinylidene chloride, 240 g of vinyl chloride and 210 g of lauryl methacrylate (LMA) was charged under an elevated pressure.

The temperature in the autoclave was elevated to 40° C. with stirring and the copolymerization was continued at the same temperature. After the polymerization for 41.5 hours, the pressure was reduced and the resulting slurry was discharged. The solid was dehydrated and washed with water and dried in Gear's oven at 55° C. for 10 hours to obtain beads of the polymer at a conversion of 90.5%. The contents of residual vinylidene chloride and vinyl chloride were respectively less than the detectable level.

The results of References and Examples are shown in Table 2.

In the processes of Examples and References, the copolymers were sampled during the drying steps and contents of residual monomers were measured. The results are shown in FIG. 1. In usual, the contents of the residual monomer were reduced in linear. In Examples, the rates of the reduction of the residual monomers were remarkably higher than those of References.

In FIG. 1, the relations of the contents of the residual monomers to drying times are shown.

TABLE 2

| Reference | Ref. 1 | Ref. 2 | Ref. 3 | Ref. 4 | Ref. 5 |
|---|---|---|---|---|---|
| Charged monomers VD/VC/comonomer | 80/20 | 80/20 | 80/20 | 78/17/5 MBI | 78/17/5 MBI |
| Plasticizer added to slurry (wt. part/100 wt. part monomers) | None | DOA 4.2 | DOA 2.4 ATBC 1.7 ESO 1.0 | None | DOA 4.5 |
| Conversion (wt. %/monomer) | 82.2 | 85.5 | 82.0 | 83.7 | 84 |
| Polymerization time (hours) | 53.0 | 53.5 | 53.0 | 52.0 | 52.0 |
| Residual monomer VD | 370 | 8.6 | 7.5 | 560 | 15.9 |
| Residual monomer VC | 4.5 | 0.4 | 0.4 | 18.1 | 0.8 |

TABLE 2'

| Example | Exp. 1 | Exp. 2 | Exp. 3 | Exp. 4 | Exp. 5 |
|---|---|---|---|---|---|
| Charged monomers VD/VC/comonomer | 80/20 | 80/20 | 78/22 | 78/17/5 MBI | 85/8/7 LMA |
| Plasticizer added | | DOA | | | |

TABLE 2'-continued

| Example | Exp. 1 | Exp. 2 | Exp. 3 | Exp. 4 | Exp. 5 |
|---|---|---|---|---|---|
| to monomers (wt. part/100 wt. part monomers) | DOA 4.2 | 2.5 ATBC 1.7 ESO 1.0 | DBS 3.0 ESO 2.0 | DOA 4.2 ESO 2.0 | polyester PN-150 4.5 |
| Conversion (wt. %/monomers) | 82.0 | 82.1 | 82.0 | 83.5 | 90.5 |
| Polymerization time (hours) | 52.0 | 53.0 | 61.0 | 52.0 | 41.5 |
| Residual monomer | | | | | |
| VD | nil | nil | nil | nil | nil |
| VC | nil | nil | nil | nil | nil |

What is claimed is:

1. In a process for producing a plasticized vinylidene chloride-vinyl chloride copolymer by copolymerizing 65 to 95 wt.% of vinylidene chloride and 35 to 5 wt.% of vinyl chloride or a mixture of vinyl chloride as a main component and a comonomer, an improvement characterized by adding 0.5 to 10.0 wt. parts of a plasticizer being soluble in said monomer mixture by a suspension polymerization in the presence of an oil soluble radical initiator and a macromolecular suspending agent in water at a continuous one-step polymerization carried out within the range of from 30° C. to 80° C.

2. A process for producing a plasticized vinylidene chloride-vinyl chloride copolymer according to claim 1 wherein 0.5 to 10.0 wt. parts of a plasticizer and 0.10 to 0.002 wt.part of an antioxidant and/or 0.02 to 5.0 wt.part of an epoxidized vegetable oil are incorporated in said monomer mixture before a polymerization.

3. A process for producing a plasticized vinylidene chloride-vinyl chloride copolymer according to claim 1 or 2 wherein said plasticizer is selected from the group consisting of esters of adipates, sebacates or citrates, polyesters of glycol and dicarboxylic acid.

4. A process for producing a plasticized vinylidene chloride-vinyl chloride copolymer according to claim 2 wherein said epoxidized vegetable oil is a compound having an epoxy value of 3.0–10.

* * * * *